(12) United States Patent
Krane

(10) Patent No.: US 9,223,484 B2
(45) Date of Patent: Dec. 29, 2015

(54) SELECTOR CONTROL FOR USER INTERFACE ELEMENTS

(71) Applicant: Rolf Krane, Weisloch (DE)

(72) Inventor: Rolf Krane, Weisloch (DE)

(73) Assignee: SAP SE, Walldorf (DE)

( * ) Notice: Subject to any disclaimer, the term of this patent is extended or adjusted under 35 U.S.C. 154(b) by 203 days.

(21) Appl. No.: 13/719,156

(22) Filed: Dec. 18, 2012

(65) Prior Publication Data
US 2014/0173480 A1 Jun. 19, 2014

(51) Int. Cl.
*G06F 3/0484* (2013.01)
*G06F 3/0481* (2013.01)

(52) U.S. Cl.
CPC .......... *G06F 3/04842* (2013.01); *G06F 3/0484* (2013.01); *G06F 3/04815* (2013.01)

(58) Field of Classification Search
CPC .................................................. G06F 3/04842
USPC ......................................................... 715/766
See application file for complete search history.

(56) References Cited

U.S. PATENT DOCUMENTS

| | | | | |
|---|---|---|---|---|
| 5,091,866 A * | 2/1992 | Takagi | ........................... | 715/803 |
| 5,317,687 A * | 5/1994 | Torres | ........................... | 715/823 |
| 5,430,839 A * | 7/1995 | Jagannathan et al. | ........ | 715/802 |
| 5,892,511 A * | 4/1999 | Gelsinger et al. | ............. | 715/794 |
| 6,147,684 A * | 11/2000 | Nielsen et al. | ................ | 715/803 |
| 7,215,345 B1 * | 5/2007 | Hanko | ........................... | 345/620 |
| 7,523,405 B2 * | 4/2009 | Robertson et al. | ............ | 715/766 |
| 7,663,620 B2 * | 2/2010 | Robertson et al. | ............ | 345/419 |
| 8,578,290 B2 * | 11/2013 | Amadio et al. | ............... | 715/778 |
| 8,928,700 B1 * | 1/2015 | Khafizova | ..................... | 345/661 |
| 2002/0089546 A1 * | 7/2002 | Kanevsky et al. | ............ | 345/800 |
| 2004/0014526 A1 * | 1/2004 | Kulas | .............................. | 463/43 |
| 2004/0066412 A1 * | 4/2004 | Becker et al. | .................. | 345/781 |
| 2007/0252804 A1 * | 11/2007 | Engel et al. | ..................... | 345/98 |
| 2008/0066006 A1 * | 3/2008 | Kim | ............................... | 715/781 |
| 2008/0229256 A1 * | 9/2008 | Shibaike | ........................ | 715/863 |
| 2011/0022987 A1 * | 1/2011 | Brubaker | ....................... | 715/847 |
| 2012/0131496 A1 * | 5/2012 | Goossens et al. | ............. | 715/784 |

FOREIGN PATENT DOCUMENTS

| EP | 0935191 A2 | 8/1999 |
|---|---|---|
| EP | 2455858 A1 | 5/2012 |

OTHER PUBLICATIONS

Extended European Search Report dated Nov. 4, 2014 for European patent application No. 13005169.1.

* cited by examiner

*Primary Examiner* — Reza Nabi
*Assistant Examiner* — Daniel Rodriguez
(74) *Attorney, Agent, or Firm* — Mintz Levin Cohn Ferris Glovsky and Popeo, P.C.

(57) ABSTRACT

A user input at a location on a user interface screen that intersects or otherwise touches a grouping of more than one overlapping user interface element can enable selection of a specific one of the overlapping user interface elements as the user interface elements in the grouping are made active in sequence (e.g. in a loop), which can be stopped by a second user input when the desired user interface element is currently active in the sequence. Related methods, system, article of manufacture, and the like are also disclosed.

20 Claims, 10 Drawing Sheets

SELECTOR CONTROL FOR USER INTERFACE ELEMENTS

TECHNICAL FIELD

The subject matter described herein relates to a control for making a selection of a user interface element, for example a user interface element displayed in a graphical user interface.

BACKGROUND

A graphical user interface can, in some examples, include one or more visual objects or "user interface elements," which can include shapes, pictures, text, combinations of such elements, or the like. In various graphical user interfaces, it is possible for multiple user interface elements to be positioned on a two-dimensional display such that at least part of one or more user interface elements overlap at least one other user interface element. In other words, a first user interface element can occupy a first area on a display of the graphical user interface. A second user interface element can occupy a second area on the display of the graphical user interface, and the first area can be at least partially contiguous with the second area such that if the first user interface element and second user interface element are both presented as opaque, the one of the first and second user interface elements depicted in a higher layer of the graphical user interface at least partially occludes or covers the other of the first and second user interface elements depicted in a lower layer of the graphical user interface. The use of the term "layers" can be used interchangeably with terms such as "ordering," "stacking," or the like, which are typically used in drawing or presentation software, such as for example PowerPoint™ or Visio™ available from Microsoft Corp. (Redmond, Wash.), or the like. These terms refer to parameters that determine how a grouping of multiple, overlapping user interface elements is presented via a graphical user interface. User interface elements in a higher layer, those that are ordered closer to a "front" or "top" of a stack, or the like are typically shown overlaying and, if set with an opaque or at least partially opaque visual characteristic, at least partially occluding those user interface elements occupying at least some of the same area on the graphical user interface and existing in a lower layer, that are ordered closer to a "back" or "bottom" of a stack, or the like.

When multiple user interface elements overlap on a graphical user interface, a user can experience difficulty in selecting a specific one of the overlapping user interface elements. Selection of a single user interface element can be desirable for a number of reasons. For example, the user may wish to move the user interface element, change a size of the user interface element, add or alter a color or texture or pattern of a line or interior of all or part of the user interface element, delete the user interface element, move the user interface element to a different layer, or the like. Selection of a user interface element in an topmost layer of the graphical user interface can typically be relatively simple—a touch on a touch screen, a "click" or other activation of a user input device for moving a pointer or cursor on the screen (e.g. a mouse, a trackpad, a trackball, or the like), one or user inputs in conjunction with a keyboard stroke, or the like within or on the boundary of a user interface element in the top layer or within or on the boundary of a user interface element that is in a lower layer but not fully occluded by another user interface element in a higher layer is usually sufficient to select such a user interface element. However, a user interface element positioned below the upper layer and at least partially occluded by one or more user interface elements in higher layers or otherwise ordered closer to the front or top of a stack can be quite challenging to select without moving one or more of the user interface elements disposed above it in higher layers or closer to the top or front of the stack.

SUMMARY

In one aspect, a method includes first detecting a first user input at a first location within a user interface. The first location intersects one or more of a boundary and an internal area of each of a plurality of user interface elements. The method further includes first identifying a first user interface element of a plurality of user interface elements as active. The first user interface element overlies and occludes at least part of a second user interface element of the plurality of user interface elements. A second user interface element of the plurality of user interface elements is second identified as active instead of the first user interface element such that the second user interface element is shown in the user interface without the first user interface element overlying and occluding the at least part of the second user interface element. A second user input is second detected at a second location in the user interface. The second location intersects one or more of the boundary and the internal area of the second user interface element. The method further includes performing a function on the active second user interface element in response to a receiving further user input.

In some variations one or more of the following can optionally be included in any feasible combination. The second identifying can occur without further user input such that the first identifying occurs for a predetermined amount of time before the second identifying occurs. The second identifying can occur in response to an additional user input. The function can include one or more of moving the user interface element to a different location on the screen, changing a size of the user interface element, adding or altering a color or texture or pattern of a line or interior of all or part of the user interface element, deleting the user interface element, moving the user interface element to a different layer. The visual indicator can include one or more of a knob element associated with the first or second user interface element when the first or second user interface element is the active user interface element, changing a visual feature of a border or at least part of the interior of at least one of the active user interface element and other user interface elements in the plurality of user interface elements that are not the active user interface element, and changing a brightness of at least one of the active user interface element and the other user interface elements in the plurality of user interface elements that are not the active user interface element. The first user input and the second user input can each include at least one of a tap or touch on a touch screen; a click or other activation of one or more of a mouse, a touchpad, a trackball, and another device for moving a pointer within the user interface; and a keyboard input.

Implementations of the current subject matter can include, but are not limited to, systems and methods including one or more features as described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
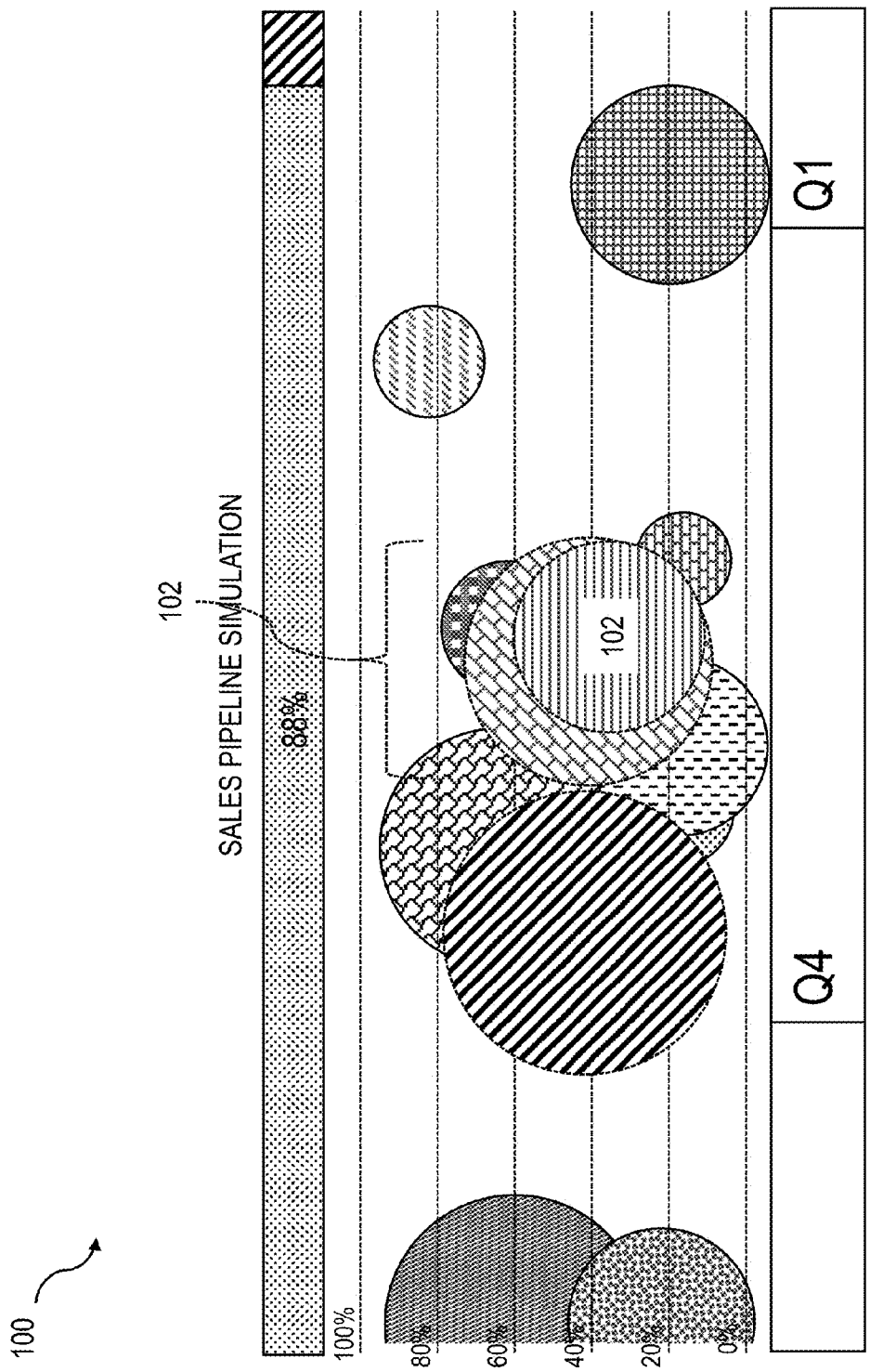
FIG. 1 through FIG. 8 show a series of screenshots of a user interface displaying features relating to selecting a user interface element consistent with implementations of the current subject matter.
Figure 2:
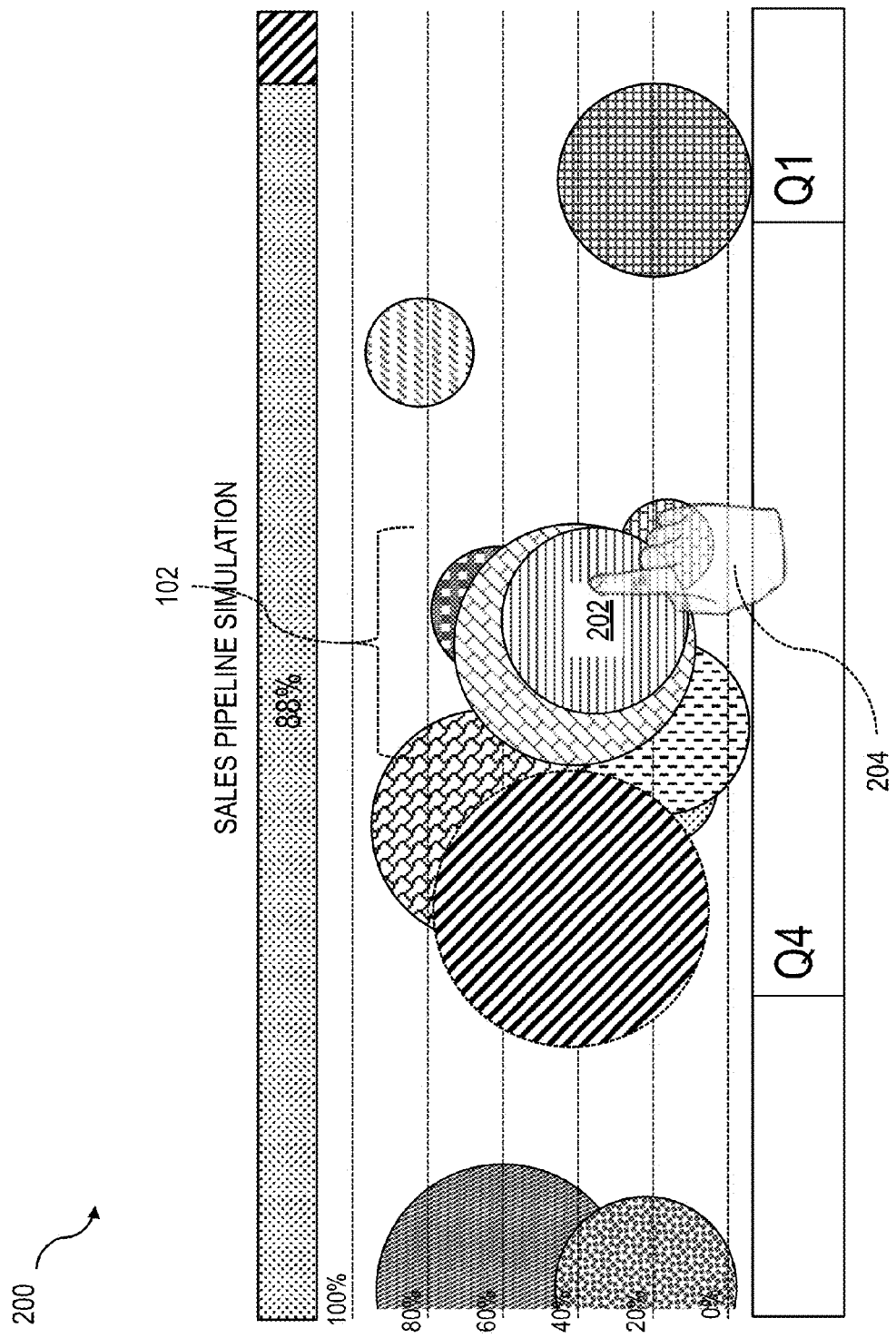

Implementations of the current subject matter can include user interface functionality in which a plurality of stacked user interface elements displayed in a graphical user interface of an application program can be selected by a first user input. Using one or more approaches consistent with the descriptions provided herein, this plurality of user interface elements can be presented in series for selection by the user via a second user input. For example, upon receipt of the first user input to select the plurality of stacked user interface elements, the application program or another software module or program operating in conjunction with the application program can cause the plurality of user interface elements to be presented for selection in sequence. A second user input received when a specific one of the plurality of stacked user interface elements is presented for selection can cause that user interface element to be made active for the user to perform one or more functions on it, for example via one or more further user inputs. For example, once the specific user interface element of the plurality of stacked user interface elements is made active, the user can perform one or more of moving the user interface element to a different location on the screen, changing a size of the user interface element, adding or altering a color or texture or pattern of a line or interior of all or part of the user interface element, deleting the user interface element, moving the user interface element to a different layer, or the like.

Any user input discussed herein should be understood be any one of a variety of user inputs available for selection of a user interface element. For example, if the computing system includes a touch screen interface, the user input can be a tap or touch within a boundary of the user interface element. If a mouse, touchpad, trackball, or other device for moving a cursor, pointer, etc. on a screen is used, a user input can include a click or other activation of such a device while the cursor, pointer, etc. is on or within a boundary of the user interface element. A user input that involves a keyboard input is also within the scope of the current subject matter.

One or more approaches can be used to indicate that a given user interface element of the plurality (e.g. a grouping) of stacked or overlapping user interface elements is currently presented for selection. For example, visual indicator that a given user interface is active (e.g. currently presented for selection) can be a knob element displayed in a manner such that the knob element is associated with the given user interface element. As used herein, the term "associated with" is used to refer to a relationship between such a knob element or other indicator or control feature and a given user interface element. The knob element and selected user interface element need not overlap or be connected or otherwise in contact on as seen on a display showing a screen of the user interface. For example, the knob element can be displayed such that at least part of it overlaps or otherwise contacts the selected user interface element. Alternatively, the knob element can be displayed proximate or otherwise adjacent to the selected user interface element.

Alternative visual indicators usable to identify a given user interface element of the plurality of stacked user interface elements is currently presented for selection (e.g. active) are also within the scope of the current subject matter. For example, the currently available for selection user interface element can be displayed in a different visual manner than the other user interface elements of the plurality. This different visual manner can optionally include one or more of making the active user interface element brighter or dimmer (e.g. changing a brightness of the active user interface element) than the other user interface elements in the plurality of user interface elements (e.g. by enhancing/dimming a brightness of the currently available under interface element and/or by dimming/brightening a brightness of the other user interface elements of the plurality), changing a visual feature of a border or at least part of the interior of the active user interface element or of the other user interface elements that are not currently active, etc.

FIG. 1 through FIG. 8 show a series of screenshots 100, 200, 300, 400, 500, 600, 700, 800 illustrating features of an approach usable for facilitating selection of a user interface element from a group of overlapping user interface elements. The series of screenshots 100-900 shows features of a graphical user interface of a program for analyzing sales pipeline data. In this example, a given sales opportunity can be represented by a circular graphical element, which a user can manipulate by moving it along a Y- (vertical) axis to reflect a probability of success, by moving it along a X- (horizontal) axis to reflect an expected time that the opportunity can be realized, and by changing its size to reflect a magnitude of the opportunity relative to other opportunities. While this example is provided to illustrate features that may be included in one or more implementations of the current subject matter, it will be understood that none of the features described are intended to be limiting. Features consistent with or otherwise similar to those described herein can be useful in a wide variety of graphical user interface applications in which a user can change a size of a graphical element of any shape and for any reason.

In the screenshot 100 of FIG. 1, several user interface elements having circular shapes are shown, including a grouping 102 of overlapping user interface elements. As noted above, each of these circular user interface elements respectively represents a sales opportunity, each having a chance of success (represented by a position along a vertical axis), a date of expected completion of the opportunity (represented by a position along a horizontal axis), and an expected value of the opportunity (represented by a size of the user interface element). In the screenshot 200 of FIG. 2, a user provides a first user input within or on the boundaries of a first user interface element 202 of the grouping 102. In this example, the user interface is presented on a touch screen, and the first user input includes a touch of the screen area representing the first user interface element 202 by part of the user's hand 204 (e.g. a finger).

In this example, the first user input results in a visual indication identifying the currently selected user interface element (in this case the first user interface element. As shown in the screenshot 300 of FIG. 3, the visual indication includes a display of a knob element 302 that is associated with the first user interface element 202. However, as noted above, one or more of any variety of visual indications of the selection of a user interface element can be used. For purposes of the discussion of the example of FIG. 1 through FIG. 9, references to a knob element 302 should be interpreted to refer to any visual indication of a currently selected user interface element unless such an interpretation is incompatible with the discussion provided.

Figure 3:
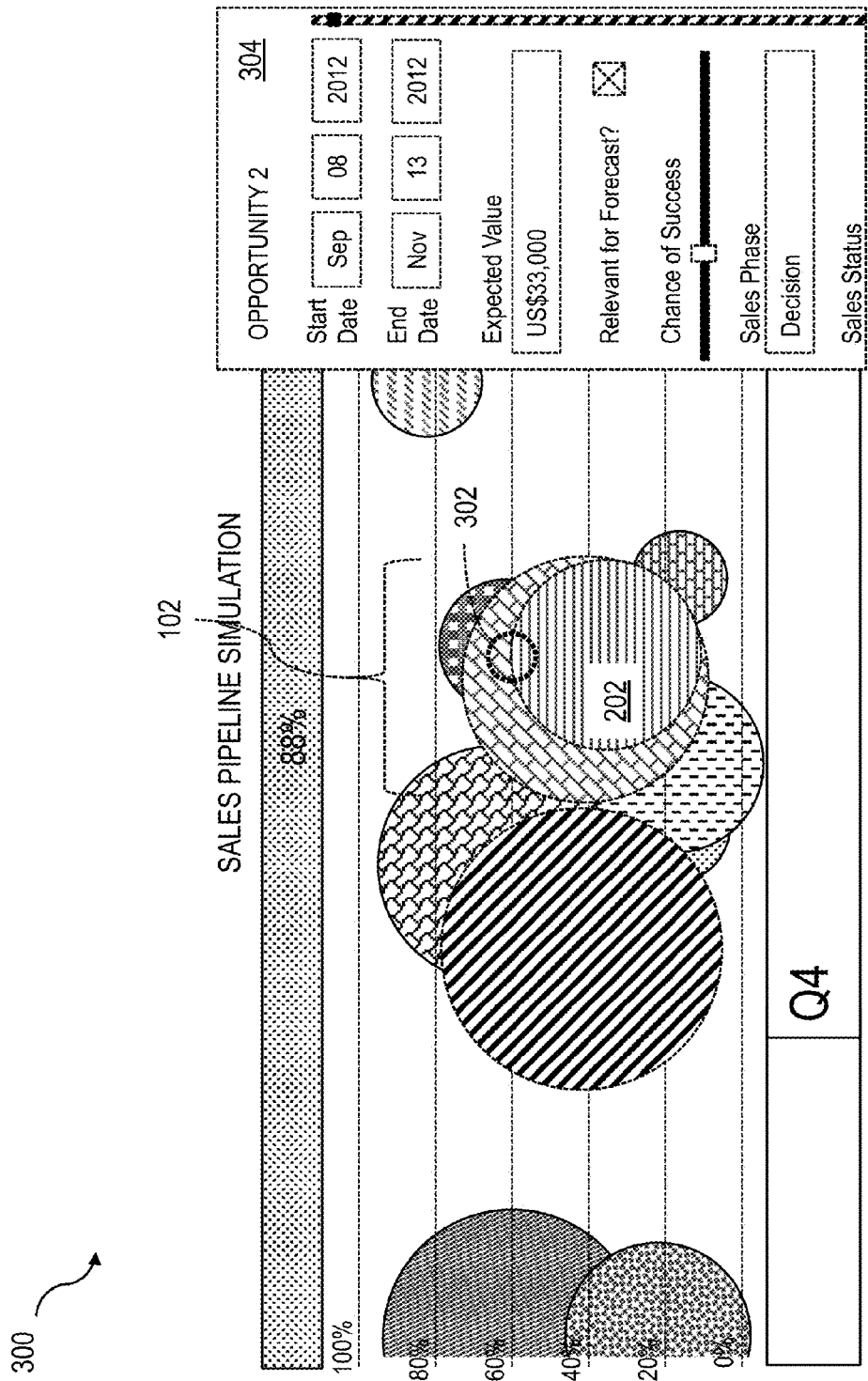

Also shown in FIG. 3 is a detail panel 304 that can optionally be displayed in response to selection of a user interface element 202. In this example, the detail panel 304 can include textual information such as a start and end date, an expected value, a chance of success, an indicator of a sales phase, etc. of the opportunity represented by the second user interface element 104.

Upon selection of the first user interface element 202, a user can be permitted to select one of the other user interface elements in the grouping 102 of overlapping user interface elements. Access to the other user interface elements in the grouping (beyond the first user interface elements 202 that received the first user input) can be provided via a progression in which each user interface element in the grouping 102 is successively identified as active. In other words, the user interface elements in the grouping 102 are made active in a sequence or cycle. A second user input when a desired one of the user interface elements in the grouping 102 is active causes the sequence (e.g. the cycling, the progression, etc.) to stop and the currently active user interface element at the time of the second user input to remain selected such that the user can perform additional actions upon the selected user interface element.

The sequence in which each user interface element in the grouping 102 is successively identified as active can be initiated in one or more of several ways. Unless otherwise specified in the claims that follow, any approach to starting the sequence after detection of a first user input is within the scope of the current subject matter. In some examples, the sequence can by initiated simply as a consequence of the first user input being detected within or on the boundaries of a first user interface element 202 of a grouping 102 of one or more user interface elements. In this example, if the first user input is detected as occurring at a point or in an area of the user interface includes a grouping 102 of two or more user interface elements that overlap, the user interface element located in an uppermost layer of the grouping 102 is shown as currently selected (e.g. as discussed above). The other user interface elements in the grouping 102 can be automatically cycled through without any further user input required. For example, after a delay of a predetermined amount of time (e.g. a second, a few second, etc.), a next user interface element in the grouping 102 can be indicated as currently selected. The predetermined amount of time can be hard coded into an application program supporting or providing the user interface, user-configurable, etc.

In another optional variation, an additional user input, such as for example a multi-touch gesture, a keyboard input, a double click or activation of an additional button of a mouse, a voice command, or the like can be necessary to initiate the sequence in which each user interface element in the grouping 102 is successively identified as active. For example, the first user input can be detected within or on the boundaries of a first user interface element 202 of a grouping 102 of one or more user interface elements. In this example, if the first user input is detected as occurring at a point or in an area of the user interface includes a grouping 102 of two or more user interface elements that overlap, the user interface element located in an uppermost layer of the grouping 102 is shown as currently selected (e.g. as discussed above). For the sequence to move to a next user interface element in the grouping, however, an additional user input (e.g. as discussed above in this paragraph) is received. Variations of this approach can function similar to a slide show: once the sequence has started, it can proceed automatically such that each user interface element in the grouping 102 is identified as active for a predetermined period of time (which can, e.g. be set by a developer, user configurable, etc.) before a next user interface element in the grouping 102 is next identified as active. An optional feature can also include advancing to a next user interface element in the grouping 102 upon detection of an additional user input, which can be a same additional user input as was detected to initiate the sequence, or alternatively some or other user input.

Figure 4:
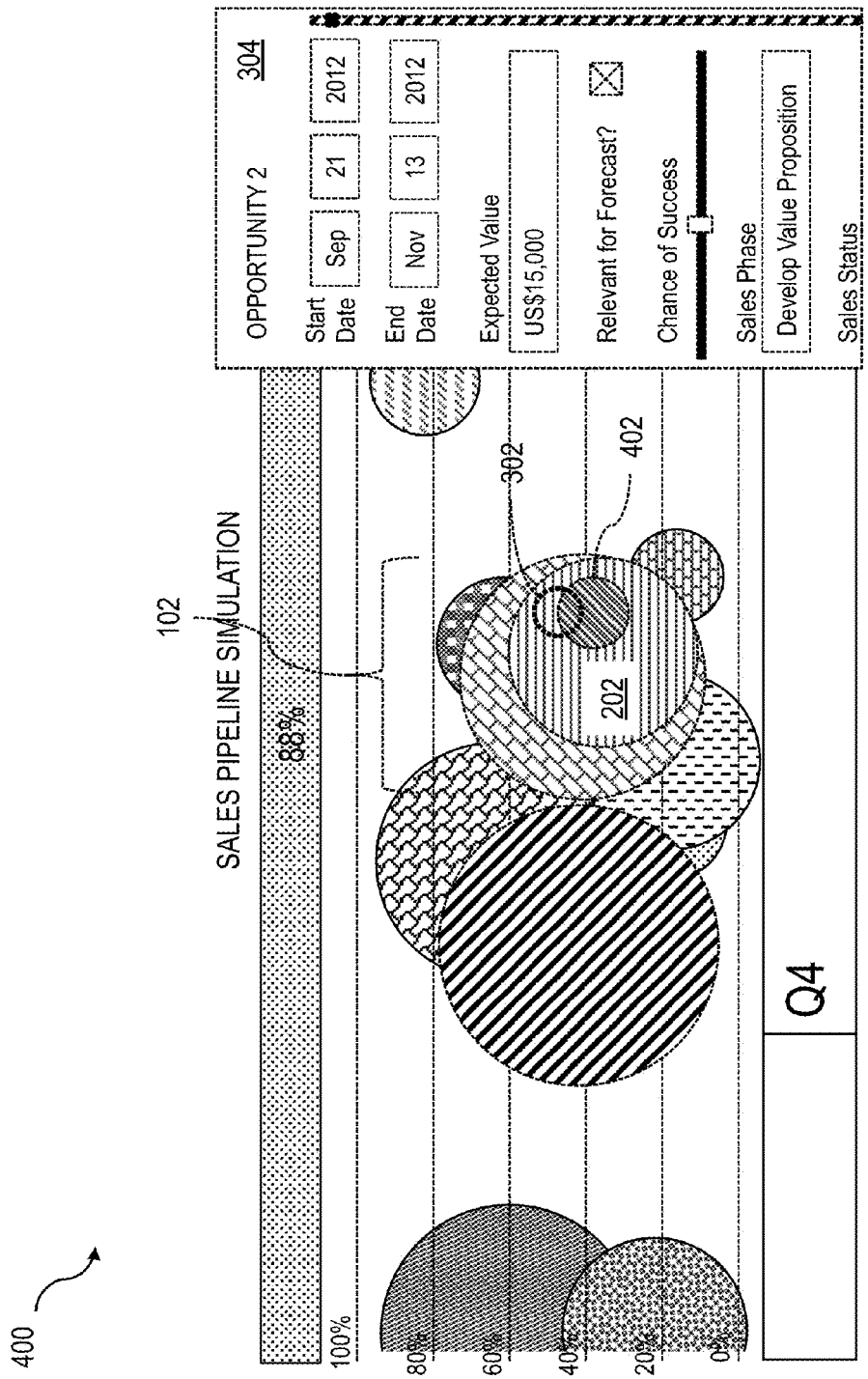
Figure 5:
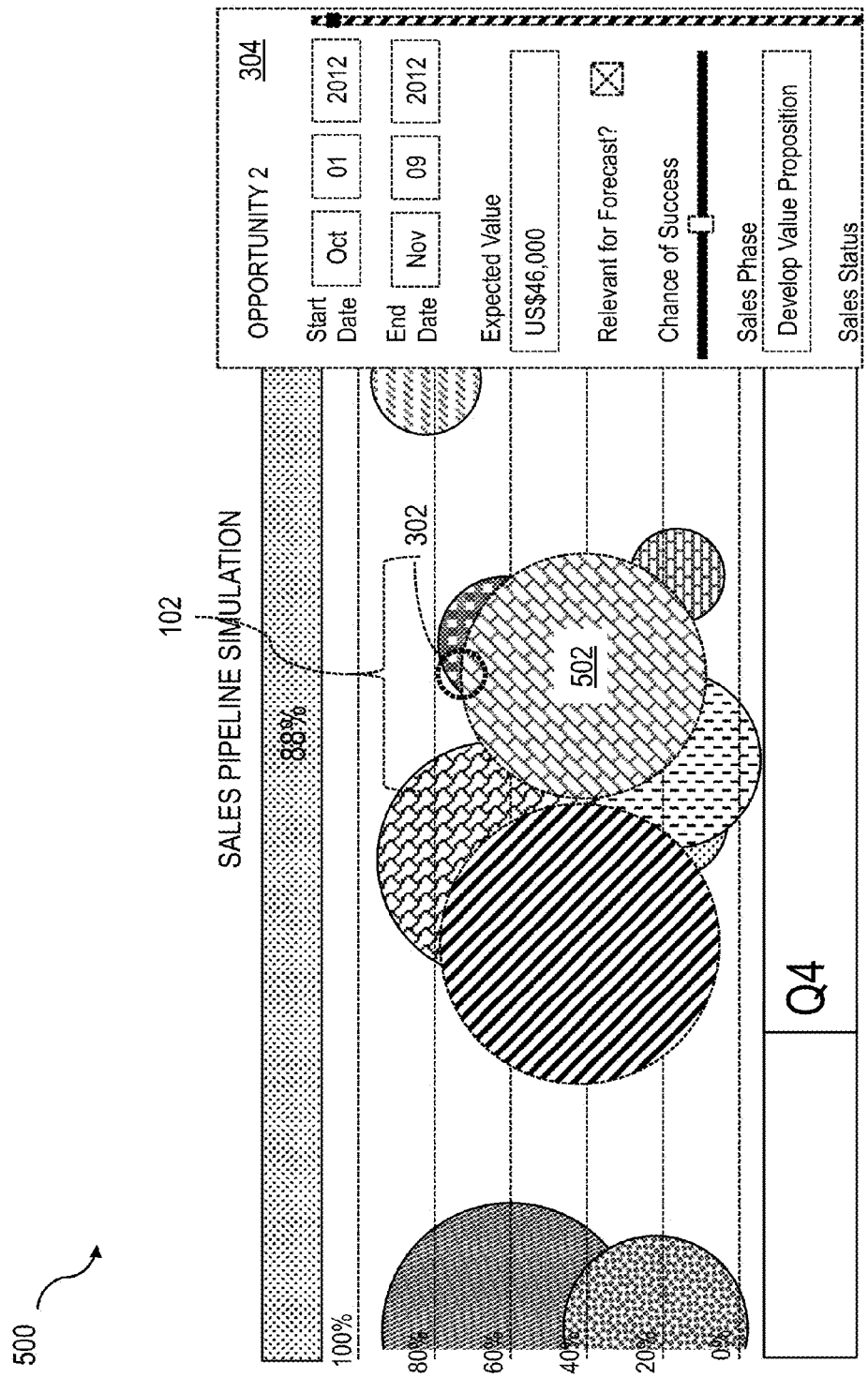
Figure 6:
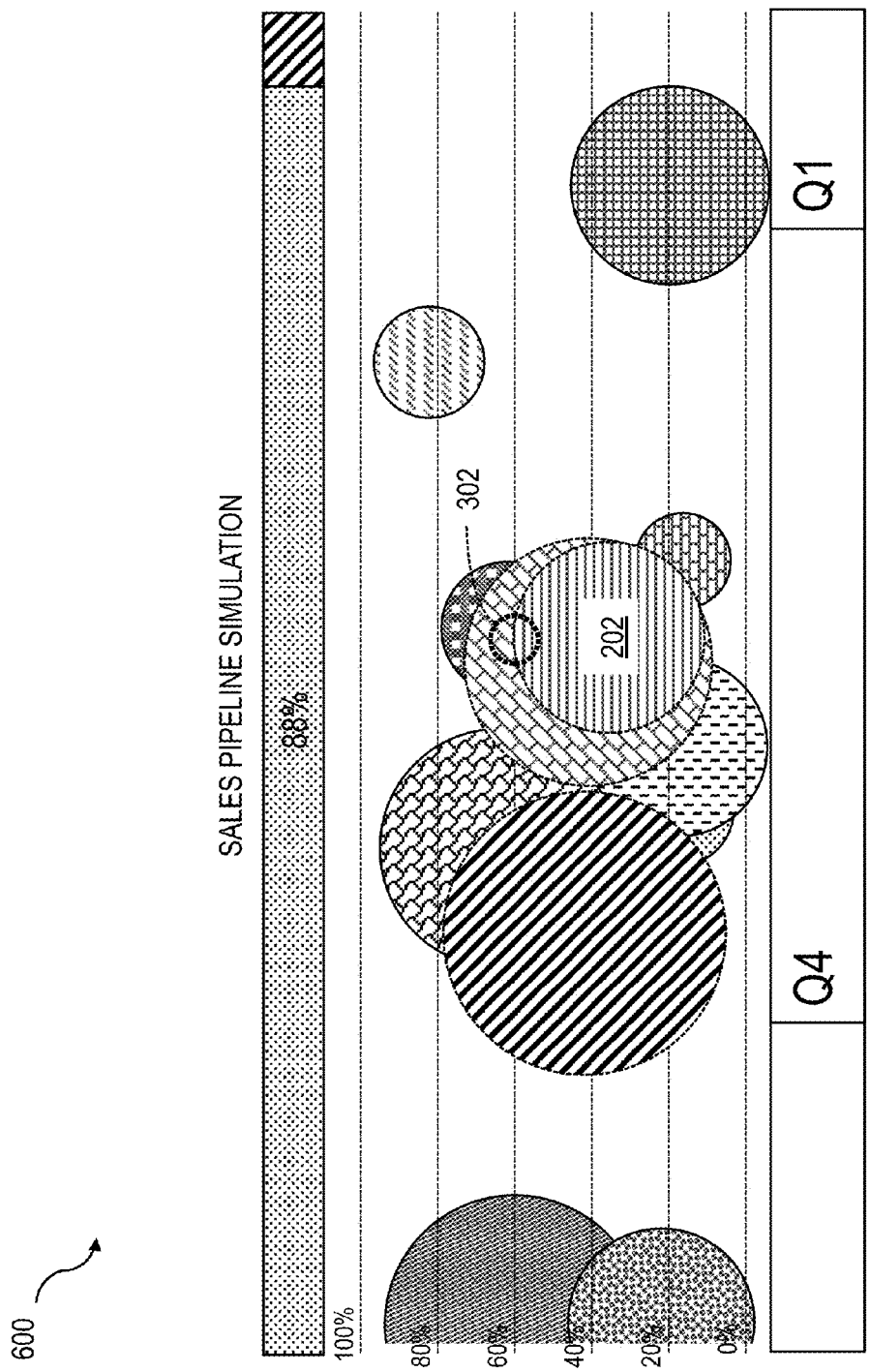
Figure 7:
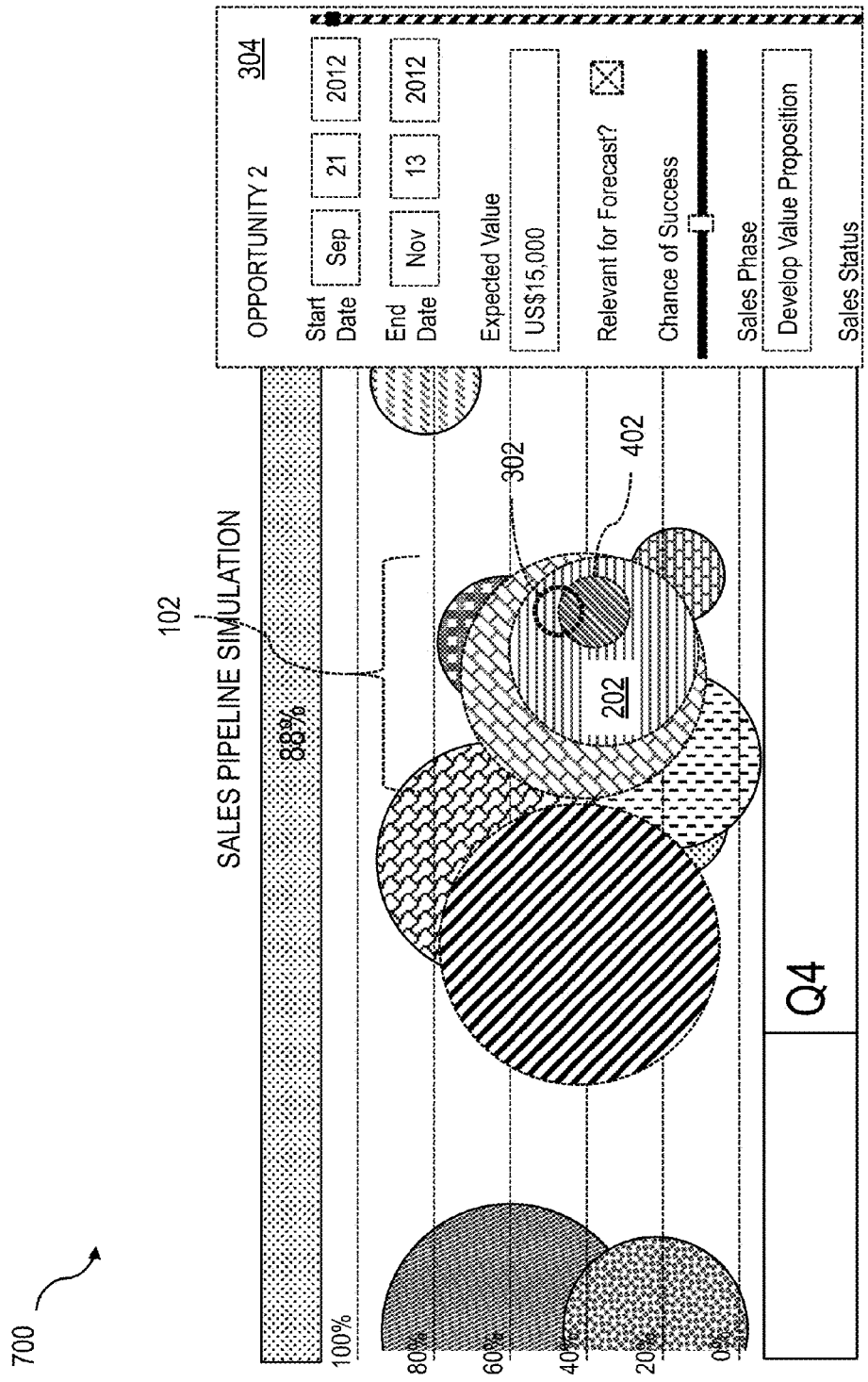
Figure 8:
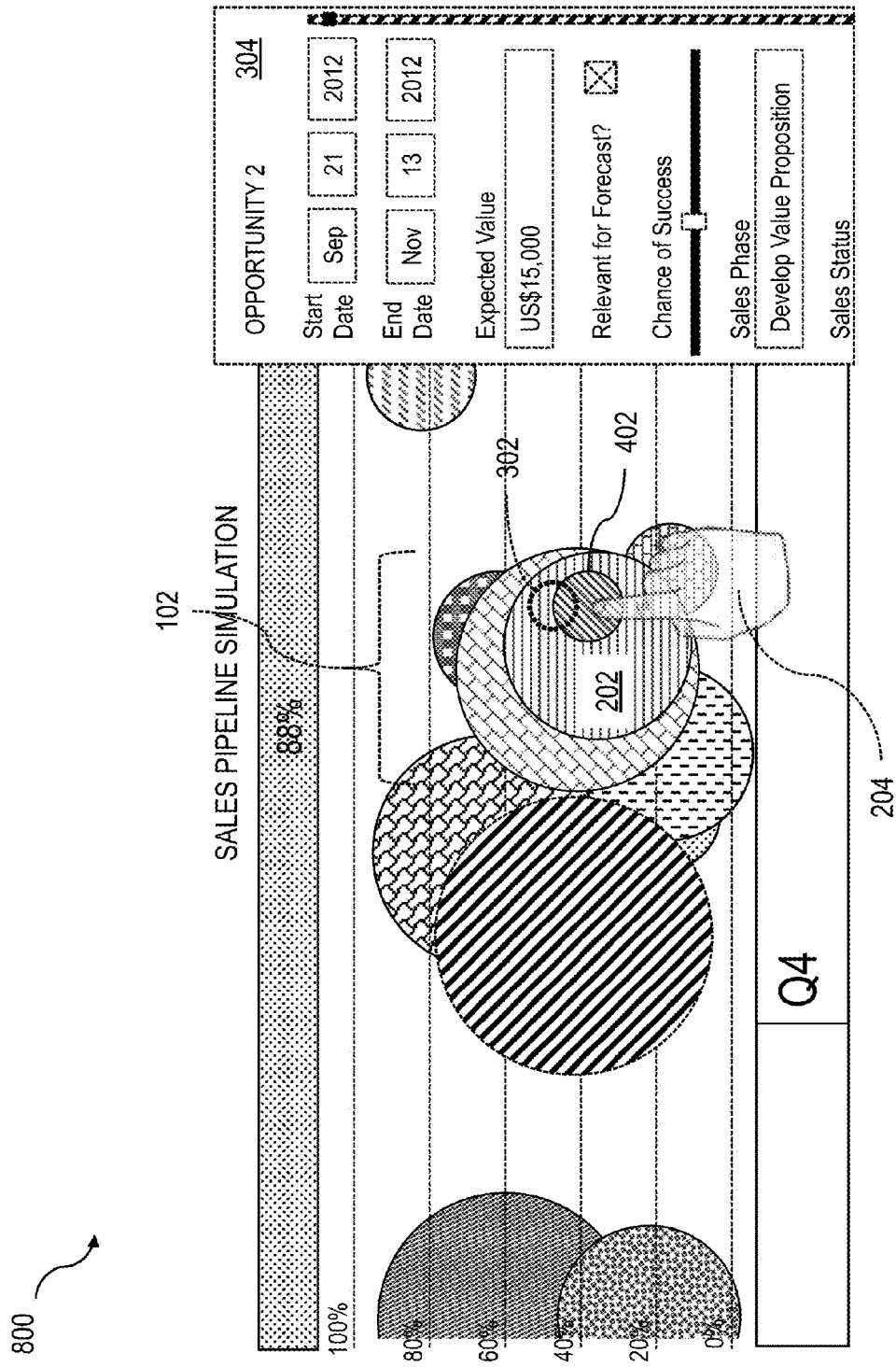

The screenshot 400 of FIG. 4 shows the sequence progressing as described above such that a second user interface element 402 of the grouping 102 of overlapping use interface elements is now identified as active. The detail panel 304 now shows information about or related to the second user interface element 402. Similarly, the screenshot 500 of FIG. 5 shows the sequence progressing as described above such that a third user interface element 502 of the grouping 102 of overlapping use interface elements is now identified as active. The detail panel 304 now shows information about or related to the second user interface element 402. The screenshot 600 of FIG. 6 shows a continuation of the sequence in which the first user interface element 202 is once again identified as active. The sequence can optionally loop back to the initially selected first user interface element 202 (e.g. the user interface element selected directly by the first user input and continue the sequence in a loop as shown in the screenshot 700 of FIG. 7, in which the second user interface element 402 is again identified as active by the presence of the knob element 302. In the screenshot 800, a second user input—in this example another touch of the screen area representing the second user interface element 202 by part of the user's hand 204 (e.g. a finger).

In the example illustrated in FIG. 1 through FIG. 8, the grouping 102 includes three user interface elements 202, 402, 502. The number of user interface elements in a grouping can be determined by the number of user interface elements having a boundary or internal area that intersects the point within the user interface where the first user input is detected. In the illustrative example, only the three user interface elements 202, 402, 502 have a boundary or internal area that intersects the point at which the first user input occurred. A grouping 102 of overlapping user interface elements as used herein can include any number (e.g. two or greater) of user interface elements.

Figure 9:
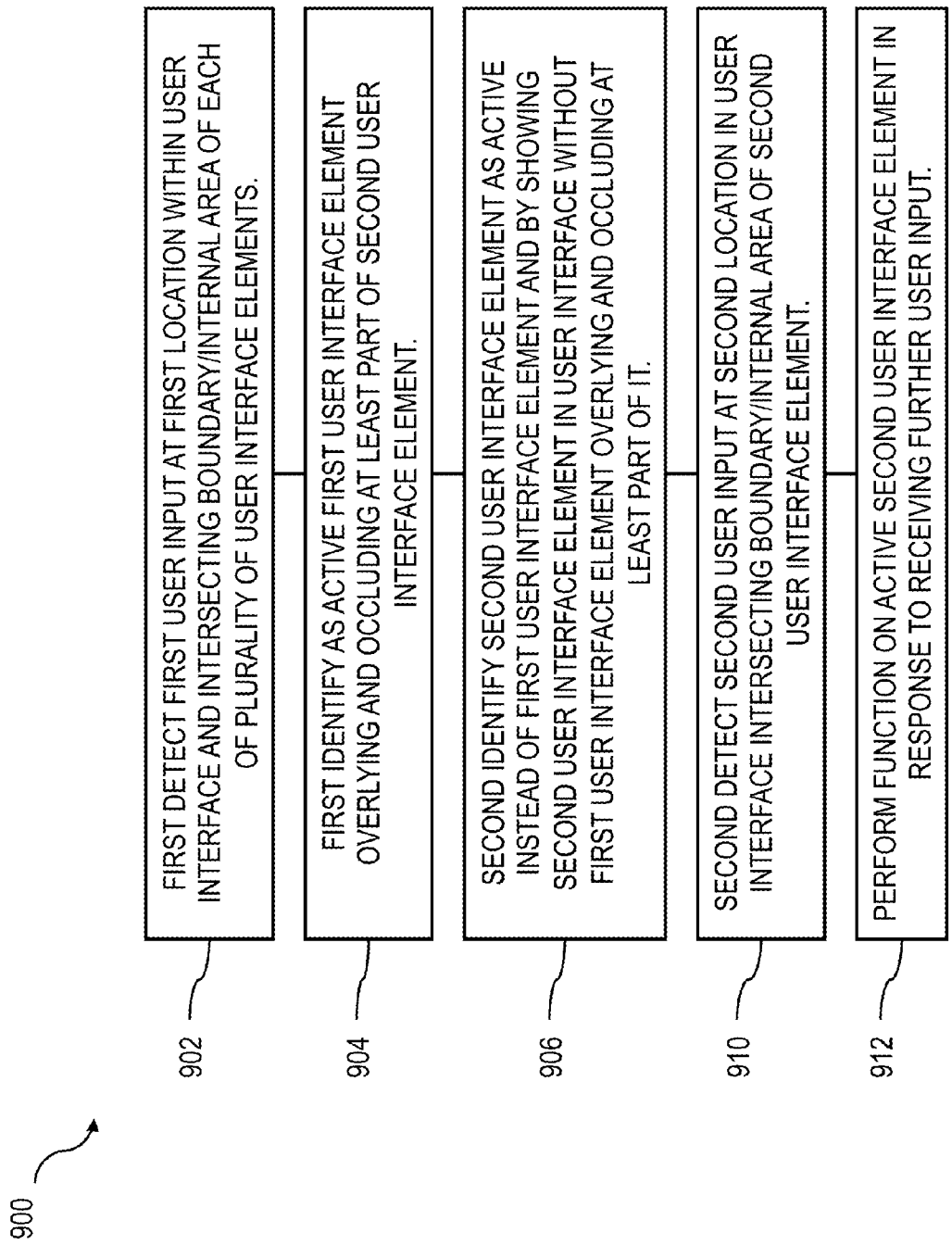
FIG. 9 is a process flow diagram illustrating aspects of a method having one or more features consistent with implementations of the current subject matter.

FIG. 9 shows a process flow diagram 900 illustrating features of a method, at least some of which can optionally be included in implementations of the current subject matter. At 902, a first user input is first detected at a first location within a user interface. The first location intersects one or more of a boundary and an internal area of each of a plurality of user interface elements. A first user interface element of the plurality of user interface elements is first identified as active at 904. The first identifying includes presenting a visual indicator associated with the first user interface element. The first user interface element overlies and occludes at least part of a second user interface element of the plurality of user interface elements. At 906, a second user interface element of the plurality of user interface elements is second identified as active instead of the first user interface element. The second identifying includes presenting a second visual indictor associated with the second user interface element. The second identifying further includes showing the second user interface element in the user interface without the first user interface element overlying and occluding the at least part of the second user interface element. A second user input that is second detected at a second location in the user interface causes the second user interface element to be selected at 910. The second location intersects one or more of the boundary and the internal area of the second user interface element. A function is performed at 912 on the active second user interface element in response to receiving further user input.

Figure 10:
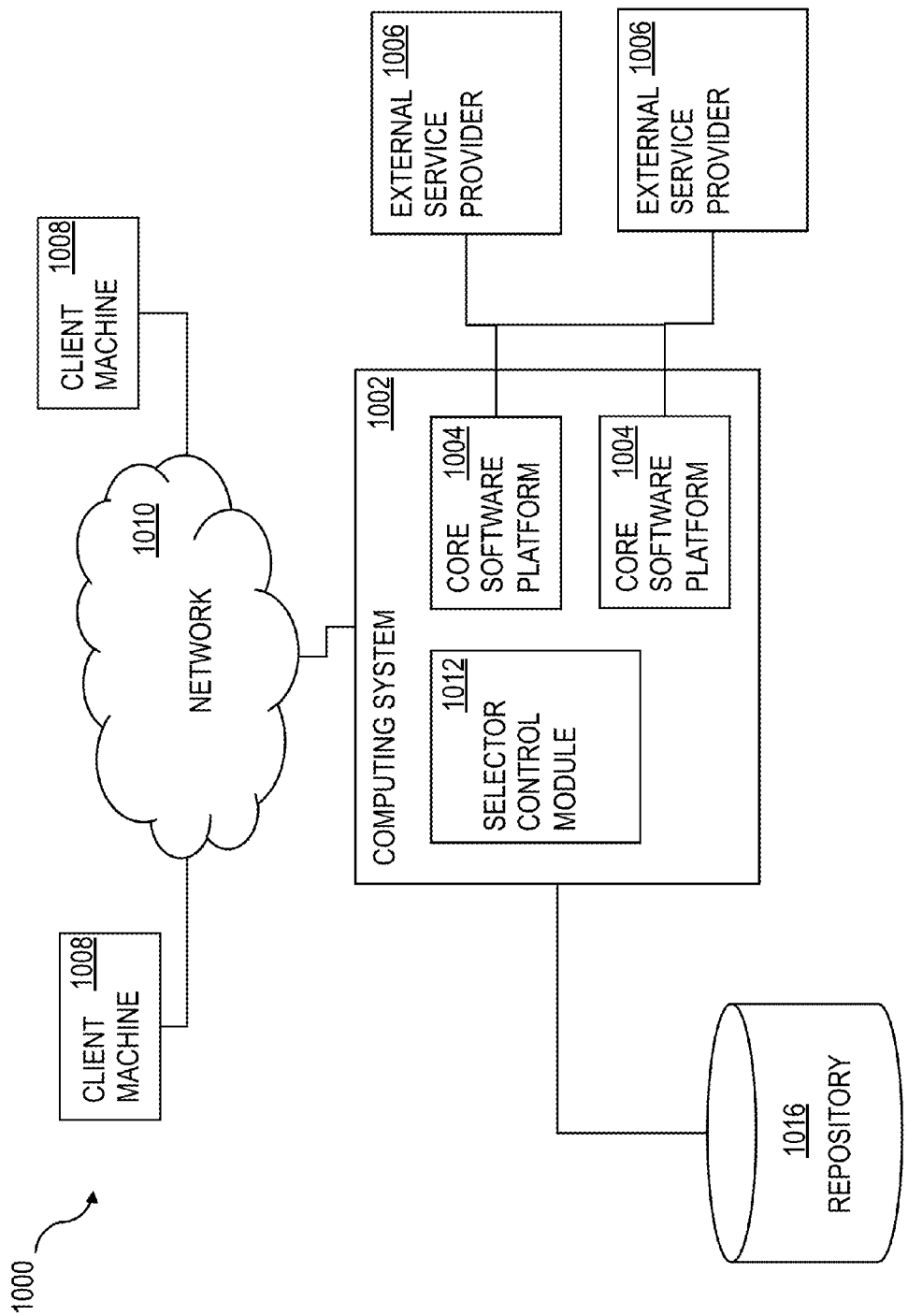
FIG. 10 is a diagram illustrating aspects of a system including features consistent with implementations of the current subject matter.

FIG. 10 shows a diagram of a system consistent with implementations of the current subject matter. A computing system 1002, which can include one or more programmable processors and can optionally be a distributed computing system with multiple parallel systems across which processing loads are distributed, can execute functions of one or more core software platform modules 1004 providing one or more features of a business or other software architecture. The computing system 1002 can optionally also aggregate or otherwise provide a gateway via which users can access functionality provided by one or more external service providers 1006. Client machines 1008, which can be computers, smart phones, tablet devices, or any other computing device, can access the computing system 1002, either via a direct connection, a local terminal, or over a network 1010 (e.g. a local area network, a wide area network, a wireless network, the Internet, or the like). A user interface element sizing module 1012 can be hosted on the computing system 1002 or alternatively, on an external system accessible over a network connection. The user interface element selector module 1012 can optionally include one or more discrete software and/or hardware modules that perform operations such as those described herein. Alternatively, one or more of the client machines 1008 can execute a module, application, other software functionality that provides one or more features similar to those described herein.

In some implementations of the current subject matter, the computing system 1002 can access one or more metadata repositories and/or other data repositories 1016 (e.g. process repositories, scenarios repositories, transactional data repositories, etc.) that can store definitions of business scenarios, business processes, and one or more business configurations as well as data, metadata, master data, etc. relating to definitions of the business scenarios, business processes, and one or more business configurations, and/or concrete instances of the data objects (e.g. business objects) that are relevant to a specific instance of the business scenario or a business process. In some examples, the definition can optionally be stored as a business object. In some implementations, the business object can include a template definition of a standard business process. The template definition that can optionally be modified via one or more extensions that are stored in the one or more metadata repositories 1016.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer program product comprising a non-transitory computer-readable storage medium storing one or more programs, the one or more programs comprising instructions that, when executed by at least one programmable processor, cause the at least one programmable processor to perform operations comprising:
    a first detecting of a first user input at a first location within a user interface, the first location intersecting one or more of a boundary and an internal area of each of a plurality of user interface elements located within a single window displayed in the user interface, wherein a shape of each of the plurality of user interface elements are circular;
    a first identifying, based on the first detecting, of a first user interface element of the plurality of user interface elements as active, the first identifying comprising presenting a visual indicator associated with the first user interface element, the first user interface element overlying and occluding at least part of a second user interface element of the plurality of user interface elements;
    a second identifying of a second user interface element of the plurality of user interface elements as active instead of the first user interface element, the second identifying comprising presenting a second visual indictor associated with the second user interface element, the second identifying further comprising showing the second user interface element in the user interface without the first user interface element overlying and occluding the at least part of the second user interface element;
    a second detecting of a second user input at a second location in the user interface determined from the second identifying, the second location intersecting one or more of the boundary and the internal area of the second user interface element; and
    performing a function on the active second user interface element in response to receiving a further user input.

2. A computer program product as in claim 1, wherein the second identifying occurs without further user input such that the first identifying occurs for a predetermined amount of time before the second identifying occurs.

3. A computer program product as in claim 1, wherein the second identifying occurs in response to an additional user input.

4. A computer program product as in claim 1, wherein the function comprises one or more of moving the user interface element to a different location on the screen, changing a size of the user interface element, adding or altering a color or texture or pattern of a line or interior of all or part of the user interface element, deleting the user interface element, moving the user interface element to a different layer.

5. A computer program product as in claim 1, wherein the visual indicator comprises one or more of a knob element associated with the first or second user interface element when the first or second user interface element is the active user interface element, changing a visual feature of a border or at least part of the interior of at least one of the active user interface element and other user interface elements in the plurality of user interface elements that are not the active user interface element, and changing a brightness of at least one of the active user interface element and the other user interface elements in the plurality of user interface elements that are not the active user interface element.

6. A computer program product as in claim 1, wherein the first user input and the second user input each comprise at least one of a tap or touch on a touch screen; a click or other activation of one or more of a mouse, a touchpad, a trackball, and another device for moving a pointer within the user interface; and a keyboard input.

7. A system comprising:
    at least one programmable processor; and
    a non-transient machine-readable medium storing instructions that, when executed by the at least one processor, cause the at least one programmable processor to perform operations comprising:
    a first detecting of a first user input at a first location within a user interface, the first location intersecting one or more of a boundary and an internal area of each of a plurality of user interface elements located within a single window displayed in the user interface, wherein a shape of each of the plurality of user interface elements are circular;
    a first identifying, based on the first detecting, of a first user interface element of the plurality of user interface elements as active, the first identifying comprising presenting a visual indicator associated with the first user interface element, the first user interface element overlying and occluding at least part of a second user interface element of the plurality of user interface elements;
    a second identifying of a second user interface element of the plurality of user interface elements as active instead of the first user interface element, the second identifying comprising presenting a second visual indictor associated with the second user interface element, the second identifying further comprising showing the second user interface element in the user interface without the first user interface element overlying and occluding the at least part of the second user interface element;
    a second detecting of a second user input at a second location in the user interface determined from the second identifying, the second location intersecting one or more of the boundary and the internal area of the second user interface element; and
    performing a function on the active second user interface element in response to receiving a further user input.

8. A computer program product as in claim 1,
wherein the presenting of the visual indicator comprises generating a graphical element within the user interface, but distinct from the first user interface element, wherein the visual indicator is positioned on the user interface to at least partially overlap the first user interface element in order to identify the first user interface element, and
wherein the presenting of the second visual indicator comprises generating a second graphical element within the user interface, but distinct from the second user interface element, wherein the second visual indicator is positioned on the user interface to at least partially overlap the second user interface element in order to identify the second user interface element.

9. A system as in claim 7, wherein the second identifying occurs without further user input such that the first identifying occurs for a predetermined amount of time before the second identifying occurs.

10. A system as in claim 7, wherein the second identifying occurs in response to an additional user input.

11. A system as in claim 7, wherein the function comprises one or more of moving the user interface element to a different location on the screen, changing a size of the user interface element, adding or altering a color or texture or pattern of a line or interior of all or part of the user interface element, deleting the user interface element, moving the user interface element to a different layer.

12. A system as in claim 7, wherein the visual indicator comprises one or more of a knob element associated with the first or second user interface element when the first or second user interface element is the active user interface element, changing a visual feature of a border or at least part of the interior of at least one of the active user interface element and other user interface elements in the plurality of user interface elements that are not the active user interface element, and changing a brightness of at least one of the active user interface element and the other user interface elements in the plurality of user interface elements that are not the active user interface element.

13. A system as in claim 7, wherein the first user input and the second user input each comprise at least one of a tap or touch on a touch screen; a click or other activation of one or more of a mouse, a touchpad, a trackball, and another device for moving a pointer within the user interface; and a keyboard input.

14. A computer-implemented method comprising:
a first detecting of a first user input at a first location within a user interface, the first location intersecting one or more of a boundary and an internal area of each of a plurality of user interface elements located within a single window displayed as a simulation application window in the user interface;
a first identifying, based on the first detecting, of a first user interface element of the plurality of user interface elements as active, the first identifying comprising presenting a visual indicator associated with the first user interface element, the first user interface element overlying and occluding at least part of a second user interface element of the plurality of user interface elements;
a second identifying of a second user interface element of the plurality of user interface elements as active instead of the first user interface element, the second identifying comprising presenting a second visual indictor associated with the second user interface element, the second identifying further comprising showing the second user interface element in the user interface without the first user interface element overlying and occluding the at least part of the second user interface element;
a second detecting of a second user input at a second location in the user interface determined from the second identifying, the second location intersecting one or more of the boundary and the internal area of the second user interface element; and
performing a function on the active second user interface element in response to receiving a further user input on the second user interface element, wherein the function includes displaying a detail window comprising simulation parameters corresponding to the second user interface element.

15. A computer-implemented method as in claim 14, wherein the second identifying occurs without further user input such that the first identifying occurs for a predetermined amount of time before the second identifying occurs.

16. A computer-implemented method as in claim 14, wherein the second identifying occurs in response to an additional user input.

17. A computer-implemented method as in claim 14, wherein the function comprises one or more of moving the user interface element to a different location on the screen, changing a size of the user interface element, adding or altering a color or texture or pattern of a line or interior of all or part of the user interface element, deleting the user interface element, moving the user interface element to a different layer.

18. A computer-implemented method as in claim 14, wherein the visual indicator comprises one or more of a knob element associated with the first or second user interface element when the first or second user interface element is the active user interface element, changing a visual feature of a border or at least part of the interior of at least one of the active user interface element and other user interface elements in the plurality of user interface elements that are not the active user interface element, and changing a brightness of at least one of the active user interface element and the other user interface elements in the plurality of user interface elements that are not the active user interface element.

19. A computer-implemented method as in claim 14, wherein the first user input and the second user input each comprise at least one of a tap or touch on a touch screen; a click or other activation of one or more of a mouse, a touchpad, a trackball, and another device for moving a pointer within the user interface; and a keyboard input.

20. A computer-implemented method as in claim 14, wherein at least one of the first detecting, the first identifying, the second detecting, the second identifying, and the performing is performed by a system comprising at least one programmable processor.

\* \* \* \* \*